United States Patent
Low et al.

(10) Patent No.: US 6,854,510 B2
(45) Date of Patent: Feb. 15, 2005

(54) SPACECRAFT RADIATOR SYSTEM AND METHOD USING CROSS-COUPLED DEPLOYABLE THERMAL RADIATORS

(75) Inventors: Lenny Low, Hillsborough, CA (US); Susan Sebata, Fremont, CA (US)

(73) Assignee: Space Systems/Loral, Inc., Palo Alto, CA (US)

( * ) Notice: Subject to any disclaimer, the term of this patent is extended or adjusted under 35 U.S.C. 154(b) by 236 days.

(21) Appl. No.: 09/841,373

(22) Filed: Apr. 24, 2001

(65) Prior Publication Data

US 2002/0153128 A1 Oct. 24, 2002

(51) Int. Cl.[7] ................................................. F28F 7/00
(52) U.S. Cl. ............... 165/41; 165/104.33; 165/104.14; 244/158 R
(58) Field of Search .................. 165/41, 104.14, 165/104.33

(56) References Cited

U.S. PATENT DOCUMENTS

| | | | | |
|---|---|---|---|---|
| 3,756,493 A | * | 9/1973 | Holmes | 229/5.5 |
| 4,603,732 A | * | 8/1986 | Niggemann | 165/41 |
| 4,706,740 A | * | 11/1987 | Mahefkey | 165/104.14 |
| 4,727,932 A | * | 3/1988 | Mahefkey | 165/41 |
| 4,738,304 A | * | 4/1988 | Chalmers et al. | 165/281 |
| 4,813,476 A | * | 3/1989 | Mahefkey | 165/272 |
| 4,815,525 A | * | 3/1989 | Readman | 165/41 |
| 4,830,097 A | * | 5/1989 | Tanzer | 165/41 |
| 5,027,892 A | * | 7/1991 | Bannon et al. | 165/41 |
| 5,036,905 A | * | 8/1991 | Eninger et al. | 165/41 |
| 5,069,274 A | * | 12/1991 | Haslett et al. | 165/272 |
| 5,101,884 A | * | 4/1992 | Leidinger | 165/41 |
| 5,267,605 A | * | 12/1993 | Doty et al. | 165/41 |
| 5,289,871 A | * | 3/1994 | Leidinger | 165/110 |
| 5,351,746 A | * | 10/1994 | Mackey et al. | 165/41 |
| 5,351,747 A | * | 10/1994 | Koeppl | 165/41 |
| 5,372,183 A | * | 12/1994 | Strickberger | 165/41 |
| 5,494,241 A | * | 2/1996 | Poulain | 244/163 |
| 5,735,489 A | * | 4/1998 | Drolen et al. | 244/163 |
| 5,743,325 A | * | 4/1998 | Esposto | 165/41 |
| 5,787,969 A | * | 8/1998 | Drolen et al. | 165/41 |
| 5,794,890 A | * | 8/1998 | Jones et al. | 244/163 |
| 5,806,800 A | * | 9/1998 | Caplin | 244/158 R |
| 5,806,803 A | * | 9/1998 | Watts | 244/163 |
| 5,823,477 A | * | 10/1998 | York | 244/163 |
| 5,954,298 A | * | 9/1999 | Basuthakur et al. | 244/163 |
| 5,957,408 A | * | 9/1999 | Hall et al. | 244/158 R |
| 6,073,887 A | * | 6/2000 | Hosick | 244/158 R |
| 6,080,962 A | * | 6/2000 | Lee | 219/209 |
| 6,098,931 A | * | 8/2000 | Bard | 244/173 |
| 6,102,339 A | * | 8/2000 | Wu et al. | 244/173 |
| 6,173,923 B1 | * | 1/2001 | Penera et al. | 244/173 |
| 6,220,548 B1 | * | 4/2001 | Hyman | 244/158 R |
| 6,230,790 B1 | * | 5/2001 | Hemingway et al. | 165/80.4 |
| 6,439,297 B1 | * | 8/2002 | Dunbar et al. | 165/46 |
| 6,478,258 B1 | * | 11/2002 | Yee | 244/163 |
| 6,591,899 B1 | * | 7/2003 | Yee | 165/104.26 |
| 6,669,147 B2 | * | 12/2003 | Bertheux et al. | 244/158 R |

* cited by examiner

*Primary Examiner*—Henry Bennett
*Assistant Examiner*—Nihir Patel
(74) *Attorney, Agent, or Firm*—Kenneth W. Float

(57) ABSTRACT

A spacecraft, along with a spacecraft radiator system and spacecraft heat dissipation method are disclosed. The spacecraft comprises a body, a plurality of solar arrays, and the spacecraft radiator system. The spacecraft radiator system comprises first and second opposite facing payload radiators, first and second opposite facing deployable radiators, and one or more coupling or loop heat pipes cross coupling opposite facing payload and deployable radiators so that they function in tandem. By cross-coupling the opposite facing payload and deployable radiators, one of the two radiators acting in tandem is always in the shade during solstice seasons. Consequently, the solar load processed by the radiator system is minimized, thereby, increasing the thermal dissipation capability of the radiator system by approximately 15%.

5 Claims, 3 Drawing Sheets

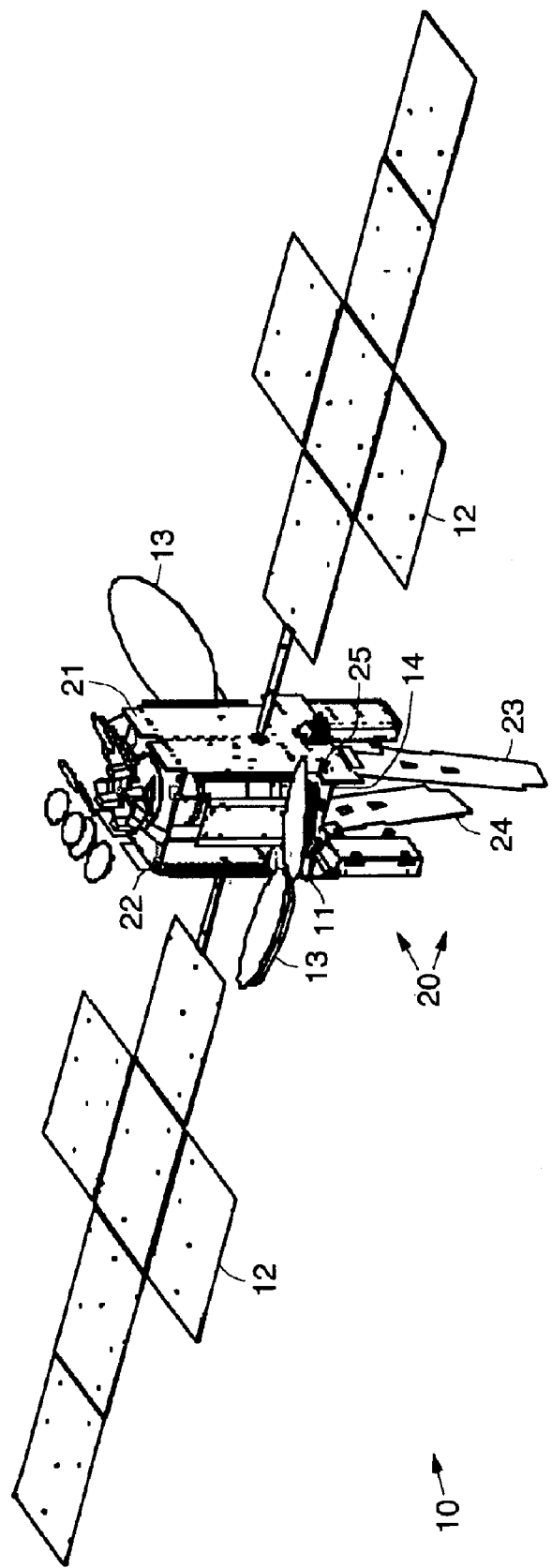

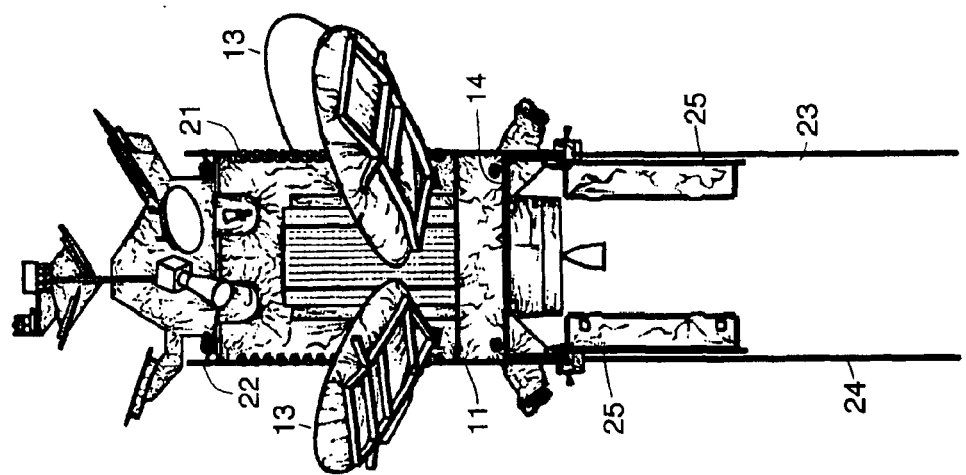
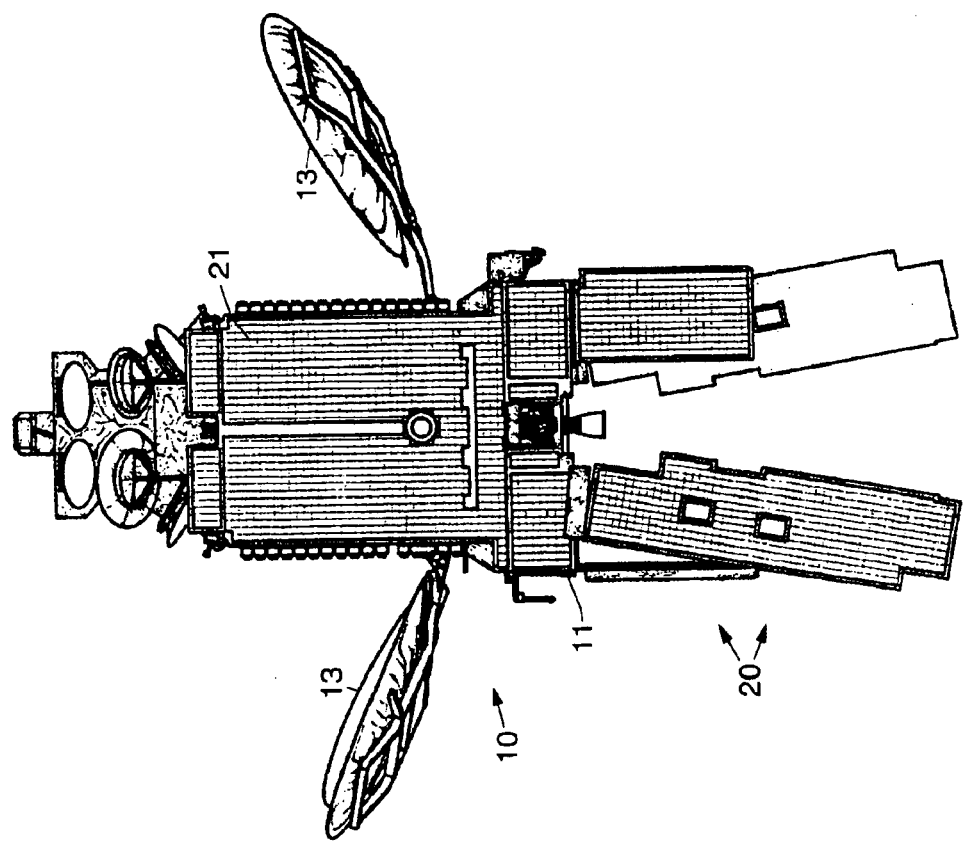

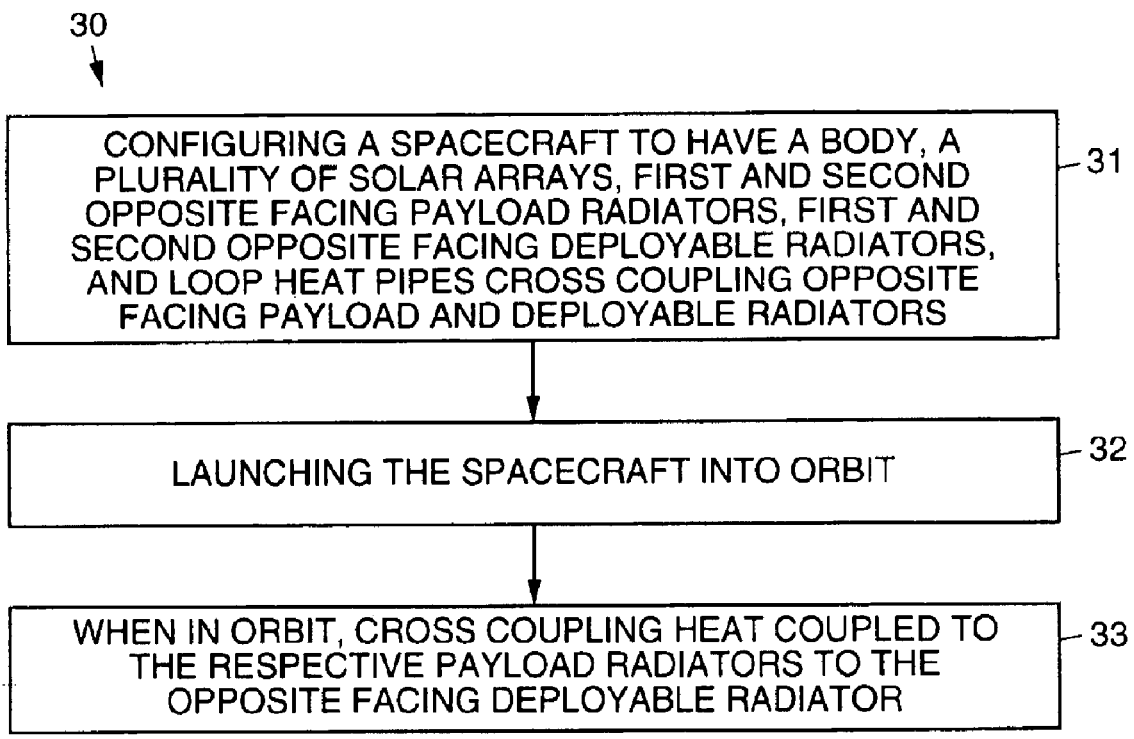

SPACECRAFT RADIATOR SYSTEM AND METHOD USING CROSS-COUPLED DEPLOYABLE THERMAL RADIATORS

BACKGROUND

The present invention relates generally to spacecraft, and more specifically, to a spacecraft radiator system comprising a cross-coupled deployable thermal radiators and spacecraft heat dissipation method.

The assignee of the present invention manufactures and deploys spacecraft into geosynchronous and low earth orbits. Such spacecraft use a radiator system to dissipate heat. The radiator system transfers thermal energy to radiator panels where it is radiated into space.

A spacecraft radiator system previously developed by the assignee of the present invention uses deployable thermal radiators currently couples a north facing payload radiator to a north facing deployable thermal radiator and a south facing payload radiator to a south facing deployable thermal radiator.

Thermal coupling of fixed radiator systems is disclosed in U.S. patent application Ser. No. 09/377,442, filed Aug. 19, 1999, entitled "Spacecraft Radiator System Using Crossing Heat Pipes", assigned to the assignee of the present invention, and U.S. Pat. No. 3,749,156 issued to Fletcher et al. entitled "Thermal Control System for a Spacecraft Modular Housing". The teachings of this patent which would accomplish nearly the same thing but in a different manner as the present invention, but results in lower performance.

The prior art discusses coupling of fixed radiator systems, no prior art discusses deployable systems. Prior art uses fixed conductance conventional heat pipes to couple the fixed radiators, this invention uses flexible loop heat pipes to couple the fixed radiator to a deployable radiator. In the prior art, the solar load is incident on the fixed radiator and coupling the panels shares the solar load, whereas, this design inherently minimizes the solar load to the system.

Accordingly, it is an objective of the present invention to provide for heat dissipating apparatus comprising a spacecraft radiator system comprising a cross-coupled deployable thermal radiators and a spacecraft heat dissipation method.

SUMMARY OF THE INVENTION

To accomplish the above and other objectives, the present invention provides for a spacecraft radiator system that thermally couples a north facing payload radiator to a south facing deployable radiator and the south facing payload radiator to the north facing deployable radiator. A spacecraft heat dissipation method is also provided.

The north facing payload radiator and the south facing deployable radiator therefore act in tandem and the south facing payload radiator and the north facing deployable radiator also act in tandem to dissipate heat generated on the spacecraft. By cross-coupling the radiators in accordance with the teachings of the present invention, one of the two radiators acting in tandem is always in the shade during solstice seasons. By thermally cross-coupling the radiators, the solar load processed by the radiator system is minimized, thereby increasing the thermal dissipation capability of the radiator system by approximately 15% compared to conventional systems.

The present invention comprises a spacecraft having a plurality of payload radiators, which are typically disposed on north and south sides of the spacecraft and a plurality of deployable radiators generally facing north and south. The deployable radiators are thermally coupled to the payload radiators using one or more coupling heat pipes, which are preferably loop heat pipes. Each payload radiator is coupled to the deployable radiator on the opposite side of the spacecraft. For example, the one or more coupling or loop heat pipes for the north deployable radiator are coupled to the south payload radiator and the one or more coupling or loop heat pipes for the south deployable radiator are coupled to the north payload radiator.

The prior art has coupled fixed radiators together, and would nearly achieve the same result as the present invention but with significantly lower efficiency and performance. If the deployable radiators were coupled to the payload radiator on the same side of the spacecraft and the payload radiators were thermally coupled, there would be substantially the same improvement in system performance as in the present invention. However, there would one additional thermal interface compared to directly coupling the payload and deployable radiators in the manner provided by the present invention. The performance improvement achieved by directly coupling the payload and deployable radiators is roughly 5% compared to 15% using the present invention.

BRIEF DESCRIPTION OF THE DRAWINGS

The various features and advantages of the present invention may be more readily understood with reference to the following detailed description taken in conjunction with the accompanying drawing, wherein like reference numerals designate like structural elements, and in which:

FIG. 1 illustrates a spacecraft employing an exemplary spacecraft radiator system in accordance with the principles of the present invention;

FIG. 2 illustrates a south side view of the spacecraft and exemplary spacecraft radiator system shown in FIG. 1;

FIG. 3 illustrates a east side view of the spacecraft and exemplary spacecraft radiator system shown in FIG. 1; and FIG. 4 is a flow diagram that illustrates an exemplary spacecraft heat dissipation method in accordance with the principles of the present invention.

DETAILED DESCRIPTION

Referring to the drawing figures, FIG. 1 illustrates a spacecraft 10 employing an exemplary spacecraft radiator system 20 in accordance with the principles of the present invention. FIGS. 2 and 3 illustrate south and east side views, respectively, of the spacecraft 10 and exemplary spacecraft radiator system 20 shown in FIG. 1.

The spacecraft 10 illustrated in FIG. 1 comprises a body 11 to which a plurality of solar arrays 12 are coupled. A plurality of antennas 13 are disposed on various faces of the body 11. The spacecraft 10 has a plurality of payload radiators 21–24, which in the exemplary embodiment comprise a north facing payload radiator 21, a south facing payload radiator 22, a north facing deployable radiator 23, and a south facing deployable radiator 24.

The north facing payload radiator 21 is thermally coupled to the south facing deployable radiator 24 by means of one or more coupling heat pipes 25, which are preferably loop heat pipes 25. Similarly, the south facing payload radiator 22 is thermally coupled to the north facing deployable radiator 23 by means of one or more coupling or loop heat pipes 25. The one or more coupling or loop heat pipes 25 extend across an aft deck 14 of the body 11 of the spacecraft 10 to connect or cross-couple the north facing payload radiator 21 to the south facing deployable radiator 24, and to connect or cross-couple the south facing payload radiator 22 to the north facing deployable radiator 23. Thus, each payload radiator 21, 24 is coupled to the associated deployable radiator 22, 23 on the opposite side of the spacecraft 10.

In accordance with the present invention, the north facing payload radiator 21 and the south facing deployable radiator 24 act in tandem, and the south facing payload radiator 22 and the north facing deployable radiator 23 also act in tandem to dissipate heat generated on the spacecraft 10. By cross-coupling the radiators 21–24 using the teachings of the present invention, one of the two radiators (radiators 21, 24 or radiators 22, 23) that act in tandem is always in the shade during solstice seasons. By thermally cross-coupling the radiators 21–24, the amount of solar load processed by the radiator system 20 is minimized. This cross-coupling of the radiators 21–24 increases the thermal dissipation capability of the radiator system 20 by approximately 15% compared to conventional systems.

FIG. 4 is a flow diagram that illustrates an exemplary spacecraft heat dissipation method 30 in accordance with the principles of the present invention. The exemplary spacecraft heat dissipation method 30 comprises the following steps.

A spacecraft 10 is configured 31 to have a body 11, a plurality of solar arrays 12, first and second opposite facing payload radiators 21, 22, first and second opposite facing deployable radiators 23, 24, and coupling or loop heat pipes 25 cross coupling opposite facing payload and deployable radiators. The spacecraft 10 is launched 32 into orbit. In orbit, heat coupled to the respective payload radiators 21, 22 is cross coupled 33 to the opposite facing deployable radiator 23, 24.

Thus, a spacecraft radiator system comprising a cross-coupled deployable thermal radiators and spacecraft heat dissipation method have been disclosed. It is to be understood that the above-described embodiments are merely illustrative of some of the many specific embodiments that represent applications of the principles of the present invention. Clearly, numerous and other arrangements can be readily devised by those skilled in the art without departing from the scope of the invention.

What is claimed is:

1. A spacecraft radiator system for use on a spacecraft having a body and a plurality of solar arrays, the system comprising:

first and second opposite facing payload radiators;

first and second opposite facing deployable radiators; and one or more coupling heat pipes that cross couple opposite facing payload and deployable radiators.

2. The spacecraft radiator system recited in claim 1 wherein the one or more coupling heat pipes comprise loop heat pipes.

3. A spacecraft comprising:

a body;

a plurality of solar arrays;

a spacecraft radiator system comprising:

first and second opposite facing payload radiators;

first and second opposite facing deployable radiators; and one or more coupling heat pities that cross couple opposite facing payload and deployable radiators.

4. The spacecraft recited in claim 3 wherein the one or more coupling heat pipes comprise loop heat pipes.

5. A spacecraft heat dissipation method comprising the steps of:

configuring a spacecraft to have a body, a plurality of solar arrays, first and second opposite facing payload radiators, first and second opposite facing deployable radiators, and loop heat pipes cross coupling opposite facing payload and deployable radiators;

launching the spacecraft into orbit; and when in orbit cross coupling heat coupled to a respective payload radiators to an opposite facing deployable radiator.

\* \* \* \* \*